United States Patent
Schmidt

(10) Patent No.: US 11,688,915 B2
(45) Date of Patent: Jun. 27, 2023

(54) ELECTROCHEMICAL ENERGY STORAGE MODULE AND VEHICLE

(71) Applicant: Bayerische Motoren Werke Aktiengesellschaft, Munich (DE)

(72) Inventor: Jan Philipp Schmidt, Holzmaden (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 306 days.

(21) Appl. No.: 16/772,356

(22) PCT Filed: Dec. 11, 2018

(86) PCT No.: PCT/EP2018/084282
§ 371 (c)(1),
(2) Date: Jun. 12, 2020

(87) PCT Pub. No.: WO2019/115496
PCT Pub. Date: Jun. 20, 2019

(65) Prior Publication Data
US 2021/0083260 A1    Mar. 18, 2021

(30) Foreign Application Priority Data

Dec. 13, 2017 (DE) .................. 10 2017 222 642.0

(51) Int. Cl.
*H01M 50/581* (2021.01)
*B60L 50/64* (2019.01)
(Continued)

(52) U.S. Cl.
CPC .......... *H01M 50/581* (2021.01); *B60L 50/64* (2019.02); *H01H 37/52* (2013.01);
(Continued)

(58) Field of Classification Search
None
See application file for complete search history.

(56) References Cited

U.S. PATENT DOCUMENTS 6,275,005 B1    8/2001  Stadnick et al.
2004/0065536 A1  4/2004  Takiagwa
(Continued)

FOREIGN PATENT DOCUMENTS

DE    10 2012 023 331 A1    6/2014
DE    10 2016 208 419 A1    11/2017
(Continued)

OTHER PUBLICATIONS

Japanese-language Office Action issued in Japanese Application No. 2020-532760 dated Apr. 20, 2022 (six (6) pages).
(Continued)

*Primary Examiner* — Brian R Ohara
*Assistant Examiner* — Patrick Marshall Greene
(74) *Attorney, Agent, or Firm* — Crowell & Moring LLP

(57) ABSTRACT

An electrochemical energy storage module and a vehicle having an energy storage module of this type. At least one energy storage cell and at least one bridging device are electrically connected in parallel. The bridging device has a first current conductor having at least one bridging point, which has a bridging point cross-section, and a second current conductor, which is spaced apart from the first current conductor by a gap. The bridging device also has a bridging switch for establishing a first partial electrical connection between the first current conductor and the second current conductor and has a bridging material arranged in the region of the bridging point.

11 Claims, 2 Drawing Sheets

(51) Int. Cl.
  *H01M 50/20* (2021.01)
  *H01M 10/0525* (2010.01)
  *H01M 10/42* (2006.01)
  *H01M 50/522* (2021.01)
  *H01M 50/503* (2021.01)
  *H01M 50/512* (2021.01)
  *H01H 37/52* (2006.01)
  *H01H 85/02* (2006.01)
  *H01H 85/04* (2006.01)

(52) U.S. Cl.
  CPC ........ *H01H 85/0241* (2013.01); *H01H 85/04* (2013.01); *H01M 10/0525* (2013.01); *H01M 10/4207* (2013.01); *H01M 50/20* (2021.01); *H01M 50/503* (2021.01); *H01M 50/512* (2021.01); *H01M 50/522* (2021.01); *H01M 2200/101* (2013.01); *H01M 2220/20* (2013.01)

(56) References Cited

U.S. PATENT DOCUMENTS

| 2007/0024407 A1* | 2/2007 | Senda | H01M 50/581 |
| | | | 337/159 |
| 2016/0126048 A1* | 5/2016 | Kawase | H01H 85/08 |
| | | | 337/295 |
| 2016/0308191 A1 | 10/2016 | Becker-Irvin et al. | |
| 2018/0342365 A1* | 11/2018 | Oh | H01H 85/147 |
| 2019/0131612 A1 | 5/2019 | Waller et al. | |

FOREIGN PATENT DOCUMENTS

| ER | 1 408 574 A2 | 4/2004 |
| JP | 2003-132873 A | 5/2003 |
| JP | 2004-134119 A | 4/2004 |
| JP | 2014-22283 A | 2/2014 |
| JP | 2015-106542 A | 6/2015 |
| JP | 2016-021299 A | 2/2016 |

OTHER PUBLICATIONS

Korean-language Office Action issued in Korean Application No. 10-2020-7017345 dated Mar. 10, 2022 with English translation (10 pages).

International Search Report (PCT/ISA/210) issued in PCT Application No. PCT/EP2018/084282 dated Apr. 4, 2019 with English translation (five (5) pages).

German-language Written Opinion (PCT/ISA/237) issued in PCT Application No. PCT/EP2018/084282 dated Apr. 4, 2019 (eight (8) pages).

German-language Search Report issued in German Application No. 10 2017 222 642.0 dated Aug. 1, 2018 with partial English translation (14 pages).

* cited by examiner

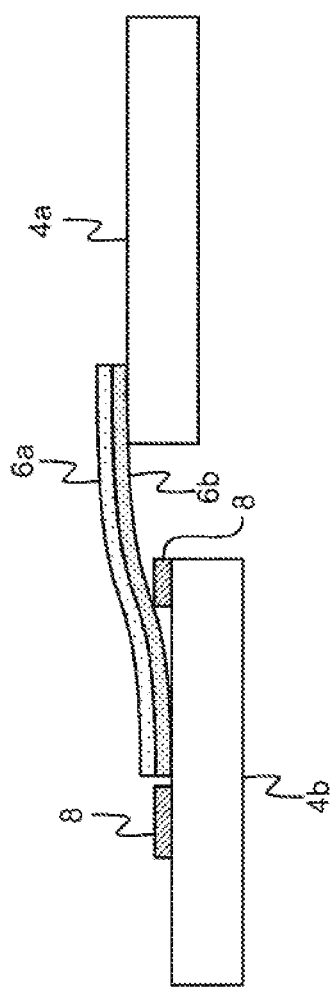

ELECTROCHEMICAL ENERGY STORAGE MODULE AND VEHICLE

BACKGROUND AND SUMMARY OF THE INVENTION

The present invention relates to an electrochemical energy storage module, in particular a lithium-ion battery, and a vehicle comprising such an energy storage module.

Owing to the everyday use of portable electronic devices and the increasing prevalence of vehicles operated by an electric motor, there is a need for electrochemical energy stores which work reliably and safely even during continuous operation and/or with high power output. Energy stores containing a plurality of electrochemical cells connected in parallel or in series are known. In order to be able to continue to operate these energy stores even after failure of one or more cells, provision can be made of circuits, for example so-called inverse fuses (anti-fuses), which bridge the failed cell if required.

It is an object of the present invention to ensure reliable bridging of one or more cells in a simple manner.

This object is achieved by means of an electrochemical energy storage module and a vehicle according to the claimed invention.

An electrochemical energy storage module according to the invention, which is in particular a lithium-ion battery, contains at least one electrochemical energy storage cell and at least one bridging device which is electrically connected in parallel with the at least one energy storage cell. The at least one bridging device includes a first current conductor having at least one bridging point having a bridging point cross-section, and a second current conductor, which is spaced apart from the first current conductor by a gap. Furthermore, the bridging device includes a bridging switch for establishing a first partial electrical connection between the first current conductor and the second current conductor, and a bridging material arranged in the region of the at least one bridging point. In this case, the bridging point cross-section and/or the bridging material are/is configured in such a way that the bridging material arranged in the region of the at least one bridging point melts as a consequence of heating of the at least one bridging point, and in the process establishes a second partial electrical connection between the first current conductor and the second current conductor. The heating of the at least one bridging point is caused by an electric current that flows through the bridging point cross-section after the first partial electrical connection has been established.

A vehicle, in particular a motor vehicle, according to the invention contains an electrochemical energy storage module according to the invention.

One aspect of the invention is based on the approach of bridging one or a plurality of energy storage cells of an electrochemical energy storage module by means of a bridging device connected in parallel by virtue of the fact that establishment of a first partial electrical connection between a first current conductor and a second current conductor spaced apart from the first current conductor by a gap triggers establishment of one or a plurality of further partial electrical connections between the first and second current conductors. To that end, a bridging switch is provided, for example an inverse fuse (so-called anti-fuse), which establishes the first partial electrical connection in a closed state, such that an electric current flows between the first and second current conductors, which electric current heats the first current conductor in the region of the at least one bridging point and thereby causes the bridging material arranged in the region of the bridging point to melt. The bridging material and/or the bridging point cross-section are/is preferably chosen and/or shaped and/or dimensioned such that the bridging material melts in the event of the current flow that is to be expected or occurs after the first electrical connection has been established. The molten bridging material then bridges the gap between the first and second current conductors in the region of the bridging point, for example by virtue of the fact that it at least partly wets the first and second current conductors and then solidifies, and thus forms a second or further partial electrical connection between the first and second current conductors.

As a result of the second partial electrical connection being established, the contact resistance between the first and second current conductors is reduced by comparison with the contact resistance that occurs when exclusively the first partial electrical connection exists. As a result, the current flow through the first and second conductors overall is increased, such that the energy storage cell is bridged reliably and efficiently.

If the energy storage cell of the energy storage module heats up for example to a temperature above a predefined operating temperature threshold, for instance 50° C., preferably 60° C., in particular 70° C., the bridging switch changes from an open state to a closed state. In this case, the bridging switch can actively be actuated or close automatically. The electric current thereupon flowing through the first and second current conductors heats the first current conductor in the region of the bridging point through the ohmic resistance defined by the bridging point cross-section in such a way that the bridging material melts and electrically conductively connects the first and second current conductors to the second partial electrical connection. As a result, the cross-sectional area through which the electric current flows between the first and second current conductors increases, such that the first current conductor in the region of the bridging point cools down again and the molten bridging material solidifies again. The second electrical connection is fixed in the process.

Overall the invention enables reliable bridging of one or more energy storage cells in a simple manner.

In one preferred embodiment, the first and/or the second current conductor have/has a plurality of bridging points having different bridging point cross-sections, in the region of which bridging material is respectively arranged. In this case, the bridging point cross-sections and/or the bridging material in the region of the respective bridging point cross-section are/is configured in such a way that the bridging material in the region of the respective bridging point cross-section melts as a consequence of heating of the respective bridging point caused by the electric current that flows through the respective bridging point cross-section after the establishment of one or a plurality of partial electrical connections between the first current conductor and the second current conductor in the region of bridging points having a smaller bridging point cross-section, and in the process establishes a further partial electrical connection between the first current conductor and the second current conductor.

The different bridging point cross-sections and/or the bridging material arranged in the region of the respective bridging points are/is preferably configured, in particular coordinated with one another and/or arranged, in such a way that, after establishment of a partial electrical connection in the region of one bridging point, the bridging material at another bridging point having a larger, in particular the next larger, bridging point cross-section melts on account of the current flow increased by the partial connection established previously and establishes a further partial electrical connection. The establishment of a partial electrical connection in the region of a bridging point having a smaller, in particular the next smaller, bridging point cross-section is thus a prerequisite for the subsequent establishment of further connections. As a result, cascade-like establishment of the partial electrical connections can be achieved, as a consequence of which the current flow through the first and second current conductors increases further and the contact resistance is reduced further.

In this case, the electric current flowing through the first and/or second current conductor is limited in particular by the bridging point cross-section of that bridging point in the region of which a partial electrical connection has not yet been established and which has the smallest bridging point cross-section of all bridging points in the region of which a partial electrical connection has not yet been established. The bridging point cross-sections and/or the bridging material arranged in the region of the bridging points are/is therefore configured in such a way that the current flow limited by the respective bridging point cross-section is sufficient to bring about heating as a consequence of which the bridging material in the region of the respective bridging point melts. As a result, a further partial electrical connection is reliably established at one bridging point if the electric current that flows through the associated bridging point cross-section is not limited by another, smaller bridging point cross-section.

Preferably, the bridging points are arranged along the first and/or second current conductor taking account of their respective bridging point cross-section in such a way that the bridging point cross-sections decrease toward the bridging switch. This makes it possible to avoid short-circuiting of bridging points in the region of which a partial electrical connection has not yet been established. As a result, this arrangement makes it possible to increase the reliability of the bridging device.

In a further preferred embodiment, the bridging switch is embodied as a bimetallic switch. In this case, the bimetallic switch is preferably fixed to the first or second current conductor and configured to bend toward the second or first current conductor, respectively, in the event of a temperature increase. If the temperature of the bimetallic switch reaches or exceeds a predefined temperature threshold value, for example a maximum permissible operating temperature of the energy storage cell of 50° C., preferably 60° C., in particular 70° C., the bimetallic switch contacts the second or first current conductor, respectively. As a result, the bridging of the energy storage cell, in particular the cascade-like establishment of the further partial electrical connections, can be triggered automatically.

In addition, the bridging switch can include a heating resistor configured to actuate the bimetallic switch. As a result, for example by means of a control device for monitoring the energy store, the first partial electrical connection can be actively established as required by energization of the heating resistor.

In a further preferred embodiment, in the region of the bridging switch on the first or second current conductor a bridging material is arranged and configured in such a way that it melts as a consequence of heating of the bridging switch and/or of the first current conductor and/or of the second current conductor caused by an electric current that flows through the bridging switch and/or the first current conductor and/or the second current conductor, and, upon solidifying again, fixes the bridging switch to the first and/or second current conductor, respectively. This makes it possible reliably to avoid unintentional opening of the bridging switch after the first partial electrical connection has been established, for instance as a result of the bimetallic switch bending back in the event of a decrease in temperature of the energy storage cell caused by the establishment of the first and/or the further electrical partial connections.

In a further preferred embodiment, the bridging material is tin. Owing to its shapeability and a melting point of approximately 232° C., tin is particularly well suited to being applied to the first and/or second current conductor in the region of the bridging points and to melting as a result of heating caused by current flow and to establishing a further partial electrical connection between the current conductors.

In a further preferred embodiment, an insulation material is arranged in the gap between the first and second current conductors. In this case, the insulation material is preferably electrically and/or thermally insulating and has in particular a low coefficient of thermal expansion. As a result, a gap width of the gap can be kept substantially constant even in the event of heating, for example on account of an increasing current flow as a consequence of further established electrical connections, of the first and/or second current conductor and unintentional disconnection of the partial electrical connections can thus be avoided.

In a further preferred embodiment, the bridging switch is configured to establish the first partial electrical connection between the first current conductor and the second current conductor when a predefined temperature threshold value of the at least one energy storage cell, in particular a maximum permissible operating temperature, is reached or exceeded. The predefined temperature threshold value can be for example 50° C., preferably 60° C., in particular 70° C. As a result, the first partial electrical connection can be reliably established before a further increase in temperature of the at least one energy storage cell causes destruction or at least damage of the energy storage cell, in particular of the energy storage module.

In a further preferred embodiment, the energy storage module includes a control device configured to establish the first partial electrical connection by means of the bridging switch when the predefined temperature threshold value of the at least one energy storage cell is reached or exceeded. Preferably, the control device includes a temperature and/or power sensor configured to detect a temperature of the at least one energy storage cell and/or an electrical power output by the at least one energy storage cell. Then, on the basis of the detected temperature and/or electrical power, optionally also taking account of further parameters and/or sensor data characterizing an operating state of the energy storage cell, the control device actuates the bridging switch in order to trigger the establishment of a plurality of partial electrical connections and to bridge the energy storage cell in the energy storage module. As a result, the bridging device can be activated particularly reliably.

Alternatively or additionally, the control device is configured to establish the first partial electrical connection by means of the bridging switch upon detection of an internal short circuit of the energy storage cell, upon detection of an impact and/or upon detection of an abnormal voltage behavior. To that end, the control device preferably includes corresponding sensors and/or is connected to corresponding sensors installed in the vehicle or the energy storage cell. As a result, in particular, damage, possibly further damage, of the energy storage cell and/or of the vehicle can be avoided.

The control device can also be configured to establish the first partial electrical connection by means of the bridging switch upon detection of a cell fault that restricts the range and/or performance of the vehicle, preferably to the extent of more than 30%. Ascertaining a dip in range and/or performance can reliably serve as an indicator that a malfunction, in particular damage, of the energy storage cell is present. The operation of a defectively working, in particular damaged, energy storage cell can thus be avoided.

In a further preferred embodiment, the first current conductor has a first current conductor cross-section and/or the second current conductor has a second current conductor cross-section. In this case, the bridging point cross-section of the at least one bridging point is smaller than the first and/or the second current conductor cross-section. The at least one bridging point is embodied for example as a taper of the first and/or second current conductor. This makes it possible to ensure that heating, in particular controlled heating, of the first and/or second current conductor takes place as a result of a current flow substantially in the region of the bridging points.

Further features, advantages and possibilities for application of the invention will become apparent from the following description in association with the figures, in which the same reference signs are used throughout for the same or mutually corresponding elements of the invention.

BRIEF DESCRIPTION OF THE DRAWINGS

FIG. 2 shows one example of a bridging switch.

DETAILED DESCRIPTION OF THE DRAWINGS

Figure 1:
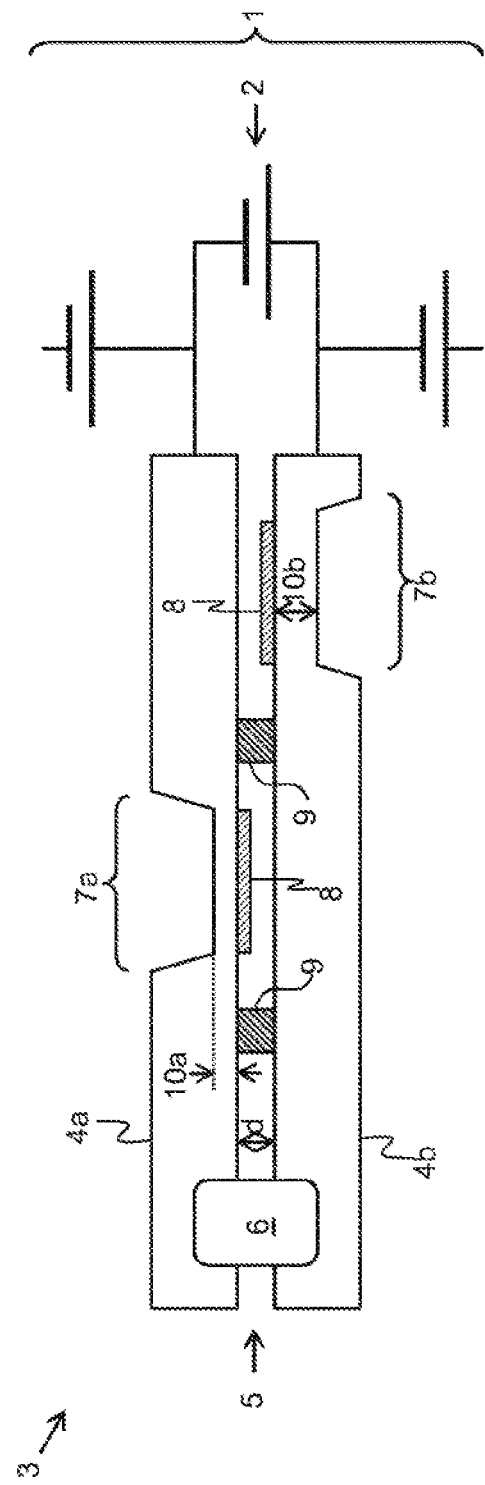
FIG. 1 shows one example of an energy storage module comprising a bridging device.

FIG. 1 shows one example of an energy storage module 1 containing a plurality of energy storage cells and a bridging device 3 for bridging an energy storage cell 2.

The bridging device 3 is electrically connected in parallel with the energy storage cell 2 and includes a first current conductor 4a, which is connected to a negative pole of the energy storage cell 2, and a second current conductor 4b, which is connected to a positive pole of the energy storage cell 2. The two current conductors 4a, 4b are separated from one another by a gap 5 having a gap width d. A bridging switch 6 is configured to establish a first partial, i.e. spatially delimited, electrically conductive connection between the two current conductors 4a, 4b across the gap 5. In addition, the first current conductor 4a has a first bridging point 7a and the second current conductor 4b has a second bridging point 7b, in the region of which at the first and second current conductors 4a and 4b, respectively, a bridging material 8 is in each case provided, by means of which—as described in even greater detail further below—a second and respectively third partial electrically conductive connection is able to be established between the two current conductors 4a, 4b.

The gap width d of the gap 5 between the current conductors 4a, 4b is large enough to avoid a breakdown of the applied voltage of the energy storage cell 2. The gap width d is for example more than 0.5 mm, preferably more than 1 mm, in particular more than 2 mm. In order to ensure the spacing apart of the two current conductors 4a, 4b and/or the electrical insulation of the first current conductor 4a from the second current conductor 4b, insulation elements 9 composed of an electrically insulating material having a low coefficient of thermal expansion are preferably arranged in the gap 5 between the two current conductors 4a, 4b.

If the bridging switch 6 is closed, the gap 5 is bridged by the bridging switch 6 and the first partial electrical connection is thus established between the current conductors 4a and 4b. The bridging switch 6 can be embodied as an electrically switchable semiconductor switch, for example, which enables a current flow between the first and second current conductors 4a, 4b when a bridging signal is present. Alternatively, the bridging switch 6 can be configured as a temperature switch, in particular as a bimetallic switch. Preferably, such a bimetallic switch or strip is secured by one end to the first or second current conductor 4a or 4b and is configured such that it bends toward the first or second current conductor 4a, 4b in the event of heating beyond a temperature threshold value in such a way that an electrical connection is established between the first and second current conductors 4a and 4b.

As a result of the first partial electrical connection established with the aid of the bridging switch 6, an electric current flows through the two current conductors 4a and 4b and thus also through a first bridging point cross-section 10a of the first current conductor 4a in the region of the first bridging point 7a and through a second bridging point cross-section 10b of the second current conductor 4b in the region of the second bridging point 7b.

In this case, the first bridging point cross-section 10a is designed such that the electric current that flows through the first bridging point cross-section 10a after the first partial electrical connection has been established causes heating of the first current conductor 4a in the region of the first bridging point 7a, which heating suffices to melt the bridging material 8 arranged in the region of the first bridging point 7a. By way of example, the first bridging point cross-section 10a can be adapted to the current flow to be expected after the closing of the bridging switch 6, in particular can be dimensioned in such a way that the current flow results in heating that suffices to melt the bridging material 8.

Alternatively or additionally, the bridging material 8 arranged in the region of the first bridging point 7a can be chosen and/or shaped and/or dimensioned such that it melts upon the abovementioned heating of the first current conductor 4a in the region of the first bridging point 7a and establishes at this point an electrical connection between the two current conductors 4a and 4b. By way of example, the bridging material 8 in the region of the first bridging point 7a can have a melting point adapted to the abovementioned heating and/or can be arranged in the form of a layer on the first current conductor 4a, in particular in the gap 5, wherein the layer is dimensioned such that it melts as a result of the heating.

The bridging material 8 that is melted in the region of the first bridging point 7a makes electrical contact with the second current conductor 4b, for example on account of the surface tension of the bridging material 8, which draws the molten bridging material 8 into the gap 5. As a result, the bridging material 8 in the region of the first bridging point 7a—in addition to the first partial electrical connection as a result of the bridging switch 6—forms a second partial electrical connection. In order that the contacting of the first and second current conductors 4a, 4b by the molten bridging material 8 is facilitated and/or made more reliable, the gap width d is preferably adapted in regard to the surface tension and/or the quantity of the material 8 arranged in the region of the bridging point 7a.

Since the electric current in the region of the first bridging point 7a now no longer flows exclusively through the first bridging point cross-section 10a, but also via the second partial electrical connection to the second current conductor 4b, the temperature caused by the current flow falls in the region of the first bridging point 7a. As a result, the bridging material 8 that melted in the region of the first bridging point 7a solidifies again and thus fixes the second partial electrical connection.

As a result of the establishment of the second partial electrical connection, which extends in particular over the entire area of the first bridging point 7a, the contact resistance between the first and second current conductors 4a, 4b, which initially is substantially determined by the first partial connection established by the bridging material 8, is reduced, such that low-resistance bridging of the cell 2 is made possible in a simple and reliable manner.

Moreover, the first and second current conductors 4a, 4b can now carry a higher electric current. This can be utilized by virtue of the fact that analogously to the first bridging point cross-section 10a and/or to the bridging material 8 arranged in the region of the first bridging point 7a, the second bridging point cross-section 10b and/or the bridging material 8 arranged in the region of the second bridging point 7b are/is configured in such a way that the bridging material 8 arranged in the region of the second bridging point 7b melts if the second current conductor 4b heats up in the region of the second bridging point 7b. In this case, the heating of the second current conductor 4b is caused by the electric current that flows through the second bridging point cross-section 10b after the second partial electrical connection has been established.

The second bridging point cross-section 10b and/or the bridging material 8 arranged in the region of the second bridging point 7b are/is configured in particular to the effect that the bridging material 8 arranged in the region of the second bridging point 7b does not melt upon heating of the second current conductor 4b in the region of the second bridging point 7b as a consequence of a current flow through the second bridging point cross-section 10b after exclusive establishment of the first partial electrical connection. For this purpose, by way of example, the second bridging point cross-section 10b is made larger than the first bridging point cross-section 10a.

As a result, cascade-like melting of the bridging material 8 arranged in the region of the bridging points 7a, 7b is made possible—i.e. first the bridging material 8 situated at the first bridging point 7a having a small cross section melts and then the bridging material 8 situated at the second bridging point 7b having a higher cross section melts—, as a result of which the partial electrical connections between the current conductors 4a, 4b are likewise established in a cascade-like manner. In this case, the contact resistance between the current conductors 4a, 4b is reduced further with each partial electrical connection additionally established.

Accordingly, over and above the example shown in FIG. 1, provision can be made of further bridging points having bridging point cross-sections that increase further and comprising bridging material respectively arranged in the region of said bridging points, which allow a continuation of the cascading described by way of example.

FIG. 2 shows one example of a bridging switch 6 configured to electrically connect a first current conductor 4a to a second current conductor 4b in the closed state. The bridging switch 6 can preferably be used in the bridging device 3 shown in FIG. 1.

In the example shown, the bridging switch 6 is embodied as a bimetallic switch, which is composed of two strips of different materials 6a, 6b having different coefficients of thermal expansion and therefore bends in the event of a temperature change.

In the present example, the bridging switch 6 is attached by a first end, preferably permanently, to the first current conductor 4a and is arranged relative to the second current conductor 4b such that the free second end does not touch (not illustrated) the second current conductor 4b at a regular operating temperature of the energy storage cell (see FIG. 1), of up to 50° C., for example. Preferably, in this temperature range the bridging switch 6 is substantially planar or rectilinear or bent only slightly.

However, if the temperature of the energy storage cell rises above the regular operating temperature, for instance as a consequence of an operating fault, the bridging switch 6 bends in the direction of the second current conductor 4b, such that its free end becomes located on the second current conductor 4b and electrically contacts the latter if the temperature of the energy storage cell reaches or exceeds a predefined temperature threshold value at which, for example, destruction or damage of the energy storage cell is shortly imminent.

As a result of the first partial electrical connection established in this way between the first current conductor 4a and the second current conductor 4b, an electric current can flow between the current conductors 4a, 4b, such that a cell that is electrically connected in parallel with the first and second current conductors 4a, 4b can be bridged.

In order to stabilize the first partial electrical connection, in the region of the bridging switch 6, in particular on the second current conductor 4b, a bridging material 8 can preferably be arranged which is configured to melt as a result of heating of the second current conductor 4b in the region of the bridging switch 6, said heating being caused by the current flow after the first partial electrical connection has been established. The bridging material 8 caused to melt in this way thereupon makes electrical contact with the still free end of the bridging switch 6 and thus reduces the contact resistance between the bridging switch 6 and the second electrical conductor 4b. As a result, the temperature caused by the current flow in the region of the bridging switch 6 decreases again, such that the molten bridging material 8 can solidify again and in the process permanently fix that end of the bridging switch 6 which has been free until this point in time to the second current conductor 4b.

LIST OF REFERENCE SIGNS

1 Energy storage module
2 Energy storage cell
3 Bridging device
4a First current conductor
4b Second current conductor
5 Gap
6 Bridging switch
6a, 6b Materials of the bridging switch
7a First bridging point
7b Second bridging point
8 Bridging material
9 Insulation element
10a First bridging point cross-section
10b Second bridging point cross-section

What is claimed is:

1. An electrochemical energy storage module, comprising at least one energy storage cell and at least one bridging device which is electrically connected in parallel with the at least one energy storage cell, wherein the at least one bridging device comprises:
- a first current conductor having at least one bridging point having a bridging point cross-section;
- a second current conductor, which is spaced apart from the first current conductor by a gap;
- a bridging switch for establishing a first partial electrical connection between the first current conductor and the second current conductor; and
- a bridging material arranged in the region of the bridging point, wherein the first and/or the second current conductor have a plurality of bridging points having different bridging point cross-sections, in the region of which bridging material is respectively arranged, wherein the bridging point cross-sections and/or the bridging material in the region of the respective bridging point are/is configured in such a way that the bridging material in the region of the respective bridging point melts as a consequence of heating of the respective bridging point caused by an electric current that flows through the respective bridging point cross-section after the establishment of one or a plurality of partial electrical connections between the first current conductor and the second current conductor in the region of bridging points having a smaller bridging point cross-section, and in the process establishes a further partial electrical connection between the first current conductor and the second current conductor, and wherein the bridging material at another bridging point having a larger or next larger bridging point cross-section melts on account of the current flow increased by the partial connection established previously and establishes the further partial electrical connection such that a cascade-like establishment of the partial electrical connections can be achieved.

2. The electrochemical energy storage module according to claim 1, wherein
the bridging switch is embodied as a bimetallic switch.

3. The electrochemical energy storage module according to claim 1, wherein
in the region of the bridging switch on the first or second current conductor bridging material is arranged and configured in such a way that it melts as a consequence of heating of the bridging switch and/or of the first current conductor and/or of the second current conductor caused by an electric current that flows through the bridging switch and/or the first current conductor and/or the second current conductor, and, upon solidifying again, fixes the bridging switch to the first and/or second current conductor, respectively.

4. The electrochemical energy storage module according to claim 1, wherein
the bridging material is tin.

5. The electrochemical energy storage module according to claim 1, wherein
an insulation material is arranged in the gap between the first and second current conductors.

6. The electrochemical energy storage module according to claim 1, wherein
the bridging switch is configured to establish the first partial electrical connection between the first current conductor and the second current conductor when a predefined temperature threshold value of the at least one energy storage cell is reached or exceeded.

7. The electrochemical energy storage module according to claim 6, comprising:
a control device configured to establish the first partial electrical connection by means of the bridging switch when the predefined temperature threshold value of the at least one energy storage cell is reached or exceeded.

8. The electrochemical energy storage module according to claim 1, wherein
the first current conductor has a first current conductor cross-section and/or the second current conductor has a second current conductor cross-section, and
the bridging point cross-section of the at least one bridging point is smaller than the first and/or the second current conductor cross-section.

9. A vehicle, comprising an electrochemical energy storage module according to claim 1.

10. The electrochemical energy storage module according to claim 1, wherein
the electrochemical energy storage module is a lithium ion battery.

11. The vehicle according to claim 9, wherein
the vehicle is a motor vehicle.

* * * * *